Figure 3:
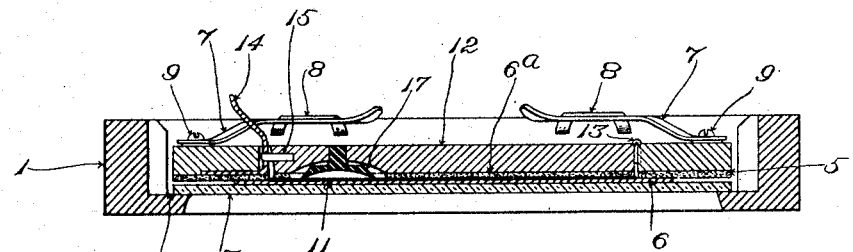

D. J. LINDSAY.
PHOTOGRAPHIC PRINTING FRAME.
APPLICATION FILED MAR. 23, 1908.
949,125.
Patented Feb. 15, 1910.
2 SHEETS—SHEET 1.
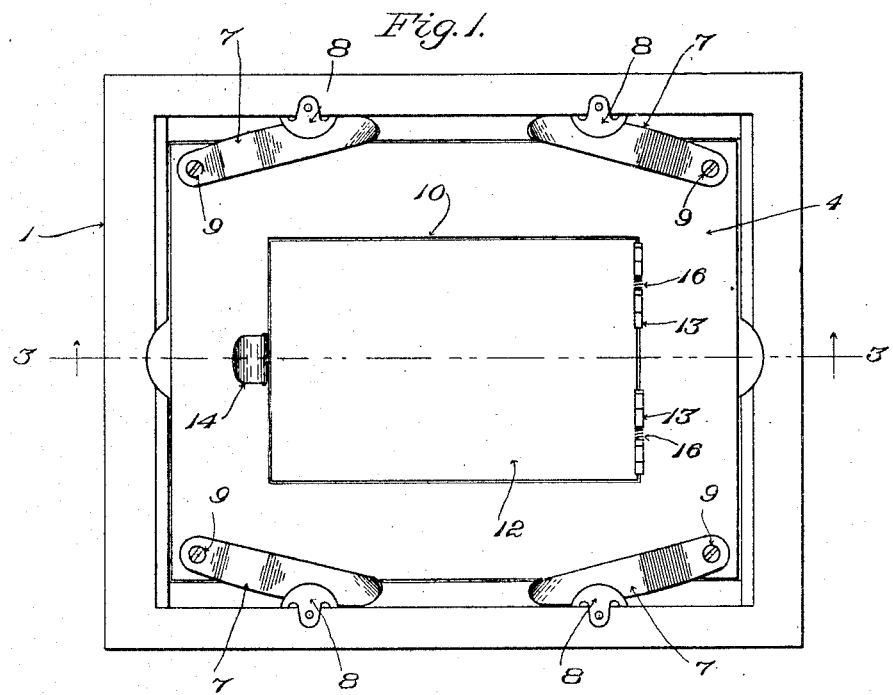
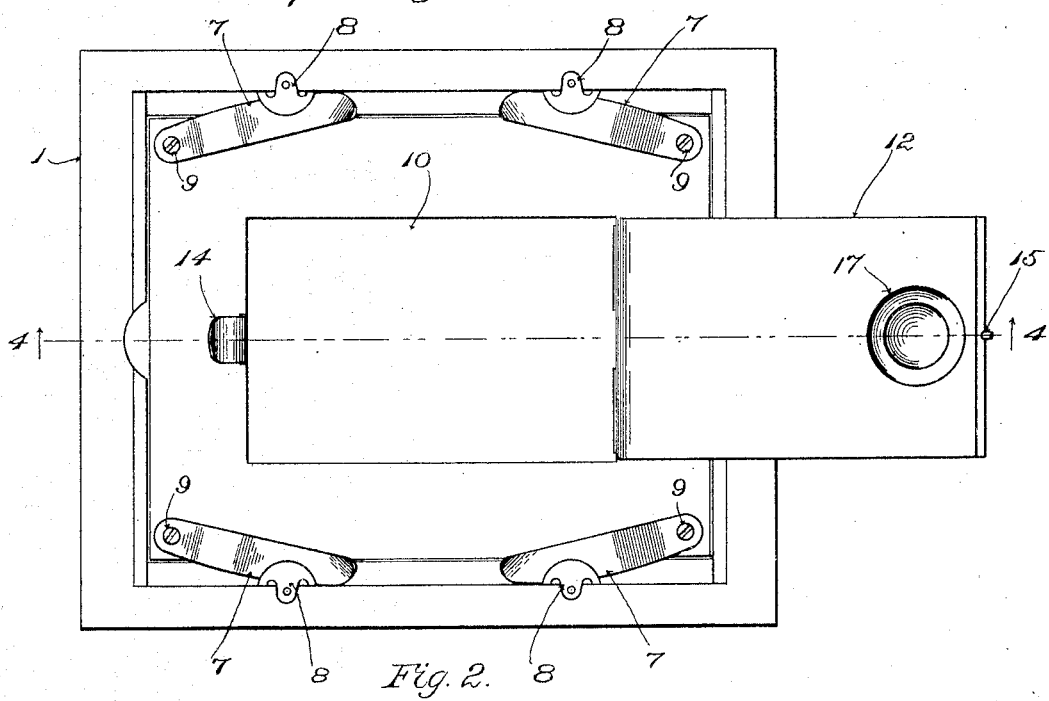
Witnesses:
Oscar F. Hill
Edith J. Anderson
Inventor:
David J. Lindsay
by Chas. F. Randall
Attorney.

D. J. LINDSAY.
PHOTOGRAPHIC PRINTING FRAME.
APPLICATION FILED MAR. 23, 1908.

949,125.

Patented Feb. 15, 1910.
2 SHEETS—SHEET 2.

Witnesses:
Oscar F. Hill
Edith J. Anderson

Inventor:
David J. Lindsay
By Chas. F. Randall
Attorney.

UNITED STATES PATENT OFFICE.

DAVID J. LINDSAY, OF NEWTON HIGHLANDS, MASSACHUSETTS.

PHOTOGRAPHIC-PRINTING FRAME.

949,125.  Specification of Letters Patent.  Patented Feb. 15, 1910.

Application filed March 23, 1908. Serial No. 422,814.

*To all whom it may concern:*

Be it known that I, DAVID J. LINDSAY, a citizen of the United States, residing at Newton Highlands, in the county of Middlesex, State of Massachusetts, have invented a certain new and useful Improvement in Photographic-Printing Frames, of which the following is a specification, reference being had therein to the accompanying drawings.

The general objects of my improvement in photographic printing frames are to facilitate the operations of opening and closing a frame, inserting a sensitized sheet or card therein in proper relation with the negative in readiness for exposure for printing, and removing the said sheet or card after the exposure.

The invention is especially useful for employment in exposing a number of sheets or cards in succession with the same negative, and enables the operator to attain an exceedingly rapid speed of manipulation, with accurate positioning or registering of the negative and each sheet or card with reference to each other.
A convenient embodiment of the invention is illustrated in the drawings, in which latter,—

Figure 4:
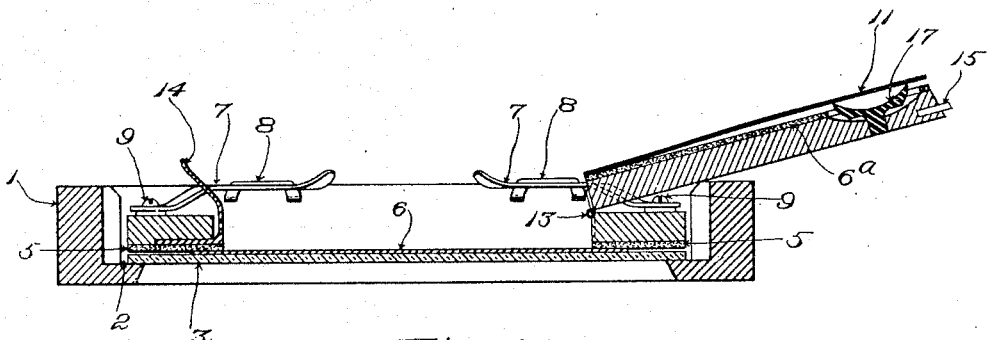

Figure 1 is a view of a photographic printing frame containing the said embodiment, looking at the back side of the said frame. Fig. 2 is a view thereof, looking at the same side, with the movable door swung out of the compartment which it normally occupies as shown in Fig. 1. Fig. 3 is a view in vertical longitudinal section in the plane indicated by dotted line 3, 3, of Fig. 1. Fig. 4 is a view in similar section in the plane of line 4, 4, of Fig. 2.

Having reference to the drawings,—the rectangular rim or open body of the printing frame is marked 1, it being provided with an interiorly-located shoulder, lip, or flange 2, Figs. 3 and 4, against which the margin of the transparent glass plate 3 rests. A back 4 occupies the central opening of the said rim or body above the plate shown in Figs. 3 and 4, and is furnished with the soft facing 5, Figs. 3 and 4, of felt, cloth, or the like, to make contact with the adjacent surface of the said plate 3, or with a negative, as 6, interposed between the plate and the back. As customary, in order to provide for putting the negative into place within the frame, and taking it out again, the back is made removable, and is detachably latched in its working position.

I have devised a convenient latching means which is shown in the drawings, and which comprises the movable latches 7, 7, 7, 7, and the fixed lugs 8, 8, 8, 8. The latches are disposed in pairs, with one of each pair located at one side edge of the back and the other located at the opposite side edge. Each latch is hinged at one end thereof by a pivotal screw 9 to the back, and is arranged to swing transversely of the frame, into and out of engagement with the coacting lug. The lugs are affixed to the rim or body 1, and project inwardly therefrom. The latches are bent so that the main portions thereof project away from the exposed face of the back and normally stand farther away than the lugs. They are engaged with the lugs by pressing the elevated portions of the latches toward the back and then swinging them outward under the lugs, after which the pressure is relieved and the latches remain under the lugs, in a state of partial flexure and consequent tension which causes the back to be held in place with a firm but yielding pressure against the negative 6 and the plate 3. By swinging the latches inwardly they are disengaged from the lugs, so as to leave the back free to be removed. The free extremities of the latches are bent or curved slightly to constitute thumb-holds, and by the disposition of the latching devices in pairs, with the members of each pair located at opposite sides of the frame, it is made possible for the operator to grasp the opposite side-bars of the frame with his two hands in a natural manner, with his thumbs directed inwardly and resting upon the two latches. By pressure of his thumbs he can operate the pair of latches simultaneously, either into engagement with the coacting lugs or out of engagement therewith, according as it is necessary to secure the back in place or release it. One pair of latches having been operated in this manner, his hands may be shifted along the side-bars and the other pair of latches may similarly be operated.

For convenience and rapidity of manipulation, I make provision for holding the negative 6 securely in a definite position within the frame, and for applying in the proper predetermined relation thereto the sensitized sheet or card which is to be exposed therewith. Thus, I form the back 4 with an opening or compartment, as at 10, Figs. 1, 2 and 4, of shape and dimensions conforming to the said sheet or card, and constituting a pocket into which the latter may be dropped. In preparing to print with a given negative, and after the latter has been placed against the transparent plate 3 and the back has been placed within the opening of the frame, but before it is latched in place, the said negative is adjusted upon the plate until it is presented in the desired position with respect to the opening or compartment. This is effected readily by inserting the fingers within the opening or compartment, when the latter is uncovered, resting them upon the portion of the negative which is exposed therein, and pushing the negative into place. It is intended that the marginal portions of the negative shall intervene between the surrounding portion of the back and plate 3, and hence when the latches are engaged with the fixed lugs the said marginal portions are clamped and the negative thereby securely held in place. A sheet or card fitting the opening or compartment registers correctly with the portion of the negative which is intended to print, and hence the printing will be effected accurately. While the negative remains held in the manner described, one sheet or card after another may be placed in the opening or compartment for exposure or printing, being removed after the latter has been effected, thus enabling the required number of prints to be made with simply one adjustment of the negative in beginning operations and without the inconvenience, trouble, and delay which are experienced when the back requires to be removed and the loose negative and sheet or card require to be adjusted and to be secured in position by the back for each print to be made.

For the purpose of closing the opening or compartment and pressing a sensitized sheet or card 11, Fig. 3, therein against the negative 6, a door 12 is provided. This door is faced with soft material 6ª to make contact with the said sheet or card. It is mounted to swing into and out of the opening or compartment upon hinges 13, 13, Figs. 1 and 3. The said figures show the door closed. It is shown in Figs. 2 and 4 swung out of the opening or compartment, leaving the latter open and unobstructed. It is locked in its closed position, as by means of a thumb-latch 14, engaging a pin 15 which projects from the free end of the door.

In order that the operator may be relieved of the necessity of lifting the door by hand out of the opening or compartment, one or more springs, as 16, 16, Fig. 1, are combined with the door, so that as soon as the latch 14 is disengaged or tripped by pressure of one's thumb or finger thereagainst the said spring or springs shall act to throw the door from its position in Figs. 1 and 3 to its position in Figs. 2 and 4.

In order that the operator may be relieved of the necessity of picking out of the opening or compartment the sheet or card which has been exposed, and that no delay may occur in the placing of the succeeding sheet of card therein for exposure, an automatic pick-up is provided, arranged to be operated by or under control of the door, and acting to remove the sheet or card from the opening or compartment when the door opens. In the illustrated embodiment of the invention the pick-up is a suction-cup 17, carried by the door, Figs. 2, 3 and 4, the working portion of which is arranged at the inner side of the door so as to engage with the sheet or card occupying the opening or compartment. When the latch 14 is sprung and the door is thrown open by the action of its spring or springs, the suction-cup causes the said sheet or card to accompany the door, leaving the opening or compartment unoccupied, so that all that is necessary to be done is to drop a fresh sheet or card into the same, remove the previous one from the suction-cup, and close the door into place again.

When a mask is employed in connection with the negative it is held in place by its marginal portions being clamped by the portions of the back around the opening or compartment. The mask, held in the manner just noted, will itself retain the negative securely in the desired position in case the latter is smaller than the opening or compartment.

For convenience the back, engaging with the marginal portions of the negative or with those of the mask when one is employed, is termed by me a retainer to indicate its functional capacity in this particular respect.

What is claimed as my invention is:—

1. In a photographic printing-frame, the combination with the body or rim, a rim-like retainer which clamps the margin of the negative all around and thereby immovably secures the negative in place, the said retainer being formed with a central opening or compartment to loosely contain a sensitized sheet or card to be exposed and cause the same to register with the negative, means for securing the retainer closed in engagement with the negative, and a hinged door for the said opening or compartment, of a thumb-latch acting directly in connection with the said door to independently hold the latter in closed condition, and a spring acting to throw the door open automatically when the latch is sprung, thereby uncovering the said opening or compartment but leaving the retainer firmly secured in its closed condition holding the negative all around its margin.

2. In a photographic printing-frame, the combination with the open body thereof, the back fitting within the opening of the said body, and having a rim arranged to clamp the margin of the negative all around and thereby immovably hold the negative in place, and formed with a chamber to loosely contain a sensitized card or the like and hold the same in the desired register with the negative, of means for holding said rim in place in engagement with the negative, and the movable door closing the said chamber and retaining the card or the like to be printed, of a latch independently holding the door closed, a door-opening spring which acts to automatically open the said chamber when such latch is sprung, leaving the back in its closed working position, and a pick-up which automatically lifts the printed card bodily out of the chamber of the back.

3. In a photographic printing-frame, the combination with the body or rim, and the back, of latching devices arranged in pairs, the members of which are disposed opposite each other, each pair comprising two detent lugs on the said body or rim and two spring thumb-levers which are pivoted at one end on the back to swing transversely from each other under the said lugs to lock the back to the body or rim, the free extremities of the said thumb-levers projecting from the surface of the back into positions to receive the pressure of the thumbs of hands grasping the side-rails of the body or rim, substantially as described.

In testimony whereof I affix my signature in presence of two witnesses.

DAVID J. LINDSAY.

Witnesses:
CHAS. F. RANDALL,
RAYMOND T. PARKE.